Figure 1:
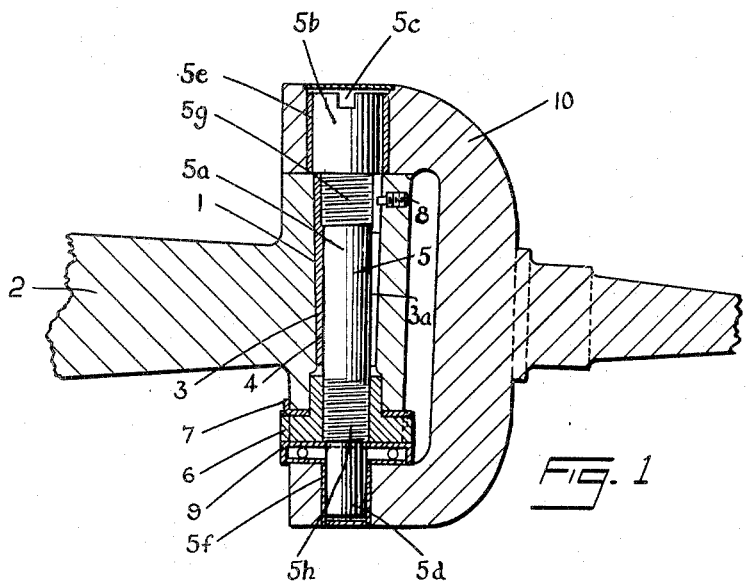

INVENTOR
KENNETH R. FUNNELL

Patented Oct. 7, 1952

2,613,091

UNITED STATES PATENT OFFICE 2,613,091

STUB AXLE OR THE LIKE HINGED ASSEMBLY

Kenneth Rutland Funnell, Blenheim, Marlborough, New Zealand, assignor to Funnells Inventions Limited, Blenheim, Marlborough, New Zealand, a New Zealand company Application December 18, 1946, Serial No. 716,976
In New Zealand March 29, 1946

5 Claims. (Cl. 287—100)

1

This invention relates to stub axle or the like hinged assemblies, and while it has been principally devised for use with the stub axles of vehicles, it will be obvious that it is applicable to a wide range of other hinged assemblies subject to the same or similar defects to those encountered in the case of such stub axles.

In the usual method of hinging a stub axle to a front axle beam in a motor vehicle, the king pin is driven through the axle beam. Said pins frequently work loose and cannot be re-tightened. Usually an oversize pin must be fitted and this is not very satisfactory as many workshops are not equipped to do such work, and moreover oversize pins are not standard stock.

Another disadvantage of the existing method of fitting king pins is that said pins frequently rust in or otherwise become "fast," and require to be driven out forcibly, a great deal of difficulty being sometimes experienced in removing said pins.

This invention aims to overcome the above disadvantages and difficulties, and to provide an improved way of assembling and dismantling stub axle or the like hinged assemblies whereby assembly and dismantling is considerably assisted, while in the preferred form of the invention shown in the drawings play developing between a hinge-pin or the like and the member to which it is secured can be readily taken up, and freedom from relative movement normally assured.

The invention consists in a stub axle or the like hinged assembly comprising a tapered hinge member; and rotary means associated with the tapered hinge member; said rotary means being adapted when rotated in one direction to cause an initial axial movement of the said hinge member, to permit ready withdrawal of the said hinge member; movement of the rotary means in the other direction being adapted to tighten the hinge member within the member to which it is secured.

Figure 2:
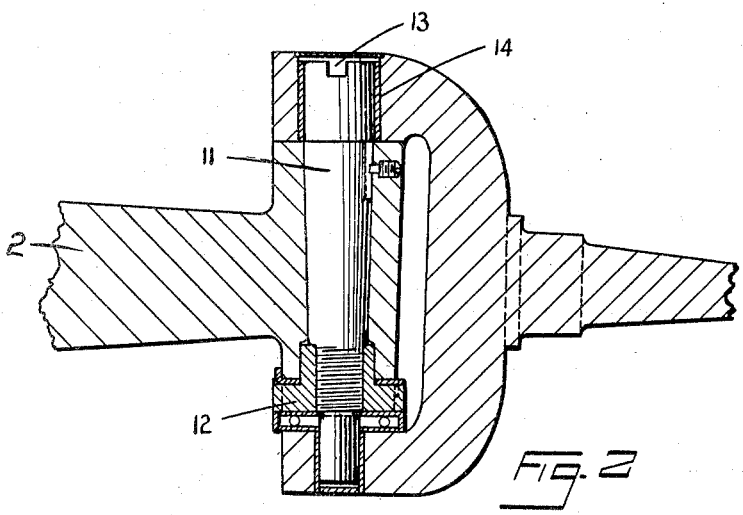

The invention, as applied to a stub axle king pin assembly, will now be described with reference to the accompanying drawings, in which:

Figure 1 is a vertical section through one form of the invention, wherein the hinge member comprises a hinge-pin with parallel sides, and a tapered split sleeve or bush around said pin, and Figure 2 is a vertical section through another form of the invention, wherein the hinge pin is tapered and the sleeve member dispensed with.

In the form of the invention shown in Figure 1, the hole 1 provided in the end of the front axle beam 2 is tapered to receive a longitudinally

2 split tapered sleeve member 3 which has its outer periphery longitudinally tapered and has an axial hole 4 therethrough of such a size as to receive the parallel shank 5a of a preferably hardened and ground hinge pin or king pin 5 which passes therethrough and has an enlarged upper journal or head 5b (slotted as at 5c) and a lower journal portion 5d, said head 5b and lower journal portion 5d being adapted to pivot in bronze bushes 5e and 5f in the stub axle 10. The tapered sleeve member 3 and king pin together form the tapered hinge member of the assembly.

The king pin 5 is provided with a threaded portion 5g just below its head, where it is screwed into the split sleeve member, and a lower threaded portion 5h just above the lower journal portion 5d, said lower threaded portion 5h being adapted in use to receive rotary means consisting of a nut 6 which is screwed onto said portion 5h and which may have slotted periphery to receive a suitable tool for turning the same.

A suitable locking washer 7 is provided between the nut 6 and the end of the axle beam 2, to lock the hinge member to the member to which it is secured.

A suitable locking grub screw 8 is provided in the end of the axle beam and is adapted to engage in the slot 3a of the hinge member so as to prevent its rotation with rotation of the rotary member or nut 6.

A ball thrust bearing 9 is provided below the rotary member or nut 6 to take the thrust.

Where the maximum diameter of the tapered sleeve is less than the internal diameter of the bush 5e, in operation, to assemble the stub axle hinged assembly, the stub axle 10 with the bushes 5e and 5f therein is brought into the correct juxtaposition with the end of the front axle beam 2, with the ball thrust bearing 9 and nut 6 and lock washer 7 in position. The king pin 5 with the split sleeve member 3 thereon is now inserted in the joint and is screwed into the nut 6. The king pin is tightened within the member to which it is secured by inserting a bar in the slot 5c to prevent it from turning and turning the nut 6 clockwise, thus applying tension to the pin and drawing said pin and the sleeve member 3 tightly into position. It will of course be obvious that the grub screw 8 will require to be inserted in the end of the axle beam during assembling, preferably after the sleeve is inserted into the tapered hole 4 in the beam. The locking washer 7 is now deformed to hold the nut 6 against rotation.

In an alternative method of assembly, which may be adopted where the maximum diameter of the sleeve is greater than the internal diameter of the bush 5e the split sleeve member 3 is inserted into the end of the axle beam before the stub axle 10 with the bushes 5e and 5f therein is brought into correct juxtaposition with the said axle beam, the king pin being introduced through the stub axle eyes and screwed into the sleeve as the nut 6 under the beam is under clockwise to engage the pin, the procedure being otherwise as above set forth.

To withdraw the king pin, the lugs on the locking washer 7 are discharged from the slots in the nut 6 which is unscrewed anticlockwise sufficiently to cause an initial axial movement of the hinge member, i. e. to ease the king pin and the sleeve member 3 by forcing same upwards, after which the king pin may be steadily unscrewed by means of a bar inserted in the slot 5c and may then be readily withdrawn. Sufficient clearance is provided in the bush 5e for the journal 5b, and sleeve member 3 to pass therethrough. The tapered steel split sleeve member 3 is removed by unscrewing the grub screw 8 and then lifting out the said sleeve member.

Alternatively if the maximum diameter of the sleeve is less than the internal diameter of the bush 5e, the head of the king pin can be held against rotation, by means of a screw-driver or tommy bar or the like engaging the slot 5c and the nut 6 turned anticlockwise to elevate the king pin and sleeve member 3 until the nut 6 disengages the thread, after which the pin, with the sleeve attached, can be lifted out.

Should the king pin wear at its upper and lower journals, said journals may be reground and refitted to undersize bushings. If the king pin becomes loose in the axle beam through wear it can be retightened by means of the nut 6.

An advantage of the form of the invention shown in the accompanying drawings is that it is possible to replace the split sleeve member 3 when necessary, and as the said sleeve member bears on a hardened and ground pin it is unlikely to wear a great deal.

It will be obvious that the king pin 5 may be substantially vertically adjusted in the axle beam by slackening off the nut 6 and screwing the king pin upwards or downwards by means of a bar in the slot 5c, the nut 6 being then tightened again.

In the alternative form of the invention, shown in Figure 2, no split sleeve member is provided, but the tapered hinge member consists of hinge or king pin 11 the outer periphery of which is longitudinally tapered, said pin being threaded to receive the rotary means or nut 12 and being slotted to accommodate the grub screw 13. It is not contended that this latter form of the invention would have all of the advantages of the preferred construction shown in the drawings. In this construction the maximum diameter of the tapered king pin must be equal to or less than the internal diameter of the upper bush 14.

The construction of this form of the invention is, in other respects, similar to that shown in Figure 1.

The operation of this latter form of the invention is similar to the operation of the form of the invention shown in Figure 1.

While, in the constructions shown, the invention is applied to a stub axle king pin assembly for a motor car or truck or the like, wherein one of the members hinged together is forked and the hinge part of the other member (the axle beam) is located in the fork, with the rotary means located, on the hinge member between the inner hinge part and one of the sides of the fork, with means (i. e. the locking washer 7, Figure 1) for locking the hinge member to the member to which it is secured, the invention is not necessarily limited to such uses. It will be obvious to any person skilled in the art what alterations will be required where the invention is utilised for other purposes.

I claim:

1. A stub axle assembly associated with an axle beam comprising a forked member, an inner member associated with the axle beam and located within the fork of the forked member, a tapered hinge member extending through the forked member and the inner member and securable within the latter, and rotary means associated with the tapered hinge member and located between the inner member and one side of the fork and abutting against the inner member, said rotary means being adapted when rotated in one direction to cause a positive initial axial movement of the said tapered hinge member to permit ready withdrawal of the latter, the rotary means being adapted when rotated in the other direction to tighten the tapered hinge member within the inner member.

2. A stub axle assembly associated with an axle beam comprising a forked member, an inner member associated with the axle beam and located within the fork of the forked member, a tapered hinge member extending through the forked member and the inner member and securable within the latter, rotary means associated with the tapered hinge member and located between the inner member and one side of the fork and abutting against the inner member, said rotary means being adapted when rotated in one direction to cause a positive initial axial movement of the said tapered hinge member to permit ready withdrawal of the latter, the rotary means being adapted when rotated in the other direction to tighten the tapered hinge member within the inner member, and the rotary means being in the form of a nut screwed onto the hinge member between the inner part and one of the sides of the fork, and means to lock the hinge member to the member to which it is secured.

3. A stub axle assembly associated with an axle beam comprising a forked member, an inner member associated with the axle beam and located within the fork of the forked member, a tapered hinge member extending through the forked member and the inner member and securable within the latter, rotary means associated with the tapered hinge member and located between the inner member and one side of the fork and abutting against the inner member, said rotary means being adapted when rotated in one direction to cause a positive initial axial movement of the said tapered hinge member to permit ready withdrawal of the latter, the rotary means being adapted when rotated in the other direction to tighten the tapered hinge member within the inner member, and the rotary means being in the form of a nut screwed onto the hinge member between the inner hinge part and one of the sides of the fork.

4. A stub axle assembly associated with an axle beam comprising a forked member, an inner member associated with the axle beam and located within the fork of the forked member, a tapered hinge member extending through the forked member and the inner member and securable within the latter, rotary means associated with the tapered hinge member and located between the inner member and one side of the fork and abutting against the inner member, said rotary means being adapted when rotated in one direction to cause a positive initial axial movement of the said tapered hinge member to permit ready withdrawal of the latter, the rotary means being adapted when rotated in the other direction to tighten the tapered hinge member within the inner member, the hinge member consisting of a king pin with its outer periphery longitudinally tapered, the rotary means being in the form of a nut screwed onto the hinge member between the inner hinge part and one of the sides of the fork, and means to lock the hinge member to the member to which it is secured.

5. A stub axle assembly associated with an axle beam comprising a forked member, an inner member associated with the axle beam and located within the fork of the forked member, a tapered hinge member extending through the forked member and the inner member and securable within the latter, rotary means associated with the tapered hinge member and located between the inner member and one side of the fork and abutting against the inner member, said rotary means being adapted when rotated in one direction to cause a positive initial axial movement of the said tapered hinge member to permit ready withdrawal of the latter, the rotary means being adapted when rotated in the other direction to tighten the tapered hinge member within the inner member, the hinge member consisting of a king pin with its outer periphery longitudinally tapered, the rotary means being the form of a nut screwed onto the hinge member between the inner hinge part and one of the sides of the fork, means to lock the hinge member to the member to which it is secured, and a ball bearing to take up the thrust of the pin.

K. R. FUNNELL.

REFERENCES CITED

The following references are of record in the file of this patent:

UNITED STATES PATENTS

| Number | Name | Date |
|---|---|---|
| 232,580 | Welch | Sept. 21, 1880 |
| 441,071 | Muir | Nov. 18, 1890 |
| 531,884 | Watrous | Jan. 1, 1895 |
| 626,707 | Livingston | June 13, 1899 |
| 946,061 | Mason | Jan. 11, 1910 |
| 961,865 | Kleinhan | June 21, 1910 |
| 1,336,812 | Bott | Apr. 13, 1920 |
| 1,698,372 | McElroy | Jan. 8, 1929 |
| 2,076,852 | Leighton | Apr. 13, 1937 |